US012172576B2

(12) United States Patent
Rajendra et al.

(10) Patent No.: US 12,172,576 B2
(45) Date of Patent: Dec. 24, 2024

(54) SYSTEM AND METHOD FOR APPROACHING VEHICLE DETECTION (71) Applicant: Ford Global Technologies, LLC, Dearborn, MI (US)

(72) Inventors: Vikas Rajendra, Novi, MI (US); Raj Sohmshetty, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 17/510,978

(22) Filed: Oct. 26, 2021

(65) Prior Publication Data
US 2023/0127465 A1 Apr. 27, 2023

(51) Int. Cl.
| G08G 1/16 | (2006.01) |
| B60Q 9/00 | (2006.01) |
| G06F 18/24 | (2023.01) |
| G06Q 10/10 | (2023.01) |
| G06T 7/62 | (2017.01) |
| G06V 10/22 | (2022.01) |
| G06V 20/56 | (2022.01) |
| G06V 20/58 | (2022.01) |

(52) U.S. Cl.
CPC ............... B60Q 9/00 (2013.01); G06F 18/24 (2023.01); G06T 7/62 (2017.01); G06V 10/225 (2022.01); G06V 20/584 (2022.01); G06V 20/588 (2022.01); G06T 2207/30256 (2013.01)

(58) Field of Classification Search
CPC ............ G06K 9/6267; G06T 7/62; G06T 2207/30256; G06V 10/225; G06V 20/584; G06V 20/588; B60Q 9/00
See application file for complete search history.

(56) References Cited

U.S. PATENT DOCUMENTS

| 6,734,787 B2* | 5/2004 | Ikeda | G08G 1/167 |
| | | | 348/148 |
| 7,486,176 B2* | 2/2009 | Bhogal | G08G 1/161 |
| | | | 340/901 |
| 8,456,327 B2* | 6/2013 | Bechtel | G06V 10/147 |
| | | | 348/297 |
| 9,711,050 B2* | 7/2017 | Ansari | G06Q 50/40 |
| 9,754,490 B2* | 9/2017 | Kentley | G06Q 10/02 |
| 10,065,557 B2* | 9/2018 | Imaishi | B60Q 1/535 |
| 10,296,794 B2* | 5/2019 | Ratti | G06V 10/764 |
| 10,875,528 B2* | 12/2020 | Shalev-Shwartz | ............ |
| | | | B60W 50/0097 |
| 10,933,868 B2* | 3/2021 | Shalev-Shwartz | ............ |
| | | | B60W 60/00272 |

(Continued)

FOREIGN PATENT DOCUMENTS

| EP | 1251032 A2 * | 10/2002 | ............ G01S 11/12 |
| WO | WO-2008027221 A2 * | 3/2008 | ........... G08G 1/0175 |
| WO | WO-2015193486 A1 * | 12/2015 | ......... B01D 67/0034 |

*Primary Examiner* — Philip P. Dang
(74) *Attorney, Agent, or Firm* — Frank Lollo; Price Heneveld LLP (57) ABSTRACT An identification apparatus for an equipped vehicle includes a camera configured to capture image data in a field of view directed to an exterior region proximate to the equipped vehicle and a controller in communication with the camera. The controller identifies an object in the image data and identifies a proportion of the object in response to pixels representing the object in the image data. The controller then communicates a notification indicating a trailing vehicle in response to the object approaching the camera in excess of a threshold.

17 Claims, 6 Drawing Sheets (56) References Cited

U.S. PATENT DOCUMENTS

| | | | | |
|---|---|---|---|---|
| 11,573,795 B1* | 2/2023 | Itani | ............... | G06F 9/3001 |
| 11,573,921 B1* | 2/2023 | Itani | ............... | G06F 21/64 |
| 11,593,290 B1* | 2/2023 | Itani | ............... | G06F 13/28 |
| 11,704,067 B2* | 7/2023 | Hung | ............... | G06T 1/60 |
| | | | | 711/165 |
| 11,726,184 B2* | 8/2023 | Ferreira | ............ | G01S 17/894 |
| | | | | 356/4.01 |
| 11,816,992 B2* | 11/2023 | Patnaik | ............ | G08G 1/207 |
| 2008/0061953 A1* | 3/2008 | Bhogal | ............ | G08G 1/161 |
| | | | | 340/435 |
| 2008/0062009 A1* | 3/2008 | Marton | ............ | G08G 1/0175 |
| | | | | 340/937 |
| 2010/0302371 A1* | 12/2010 | Abrams | ............ | G08G 1/0175 |
| | | | | 348/149 |
| 2017/0200061 A1* | 7/2017 | Julian | ............... | G08G 1/04 |
| 2021/0240197 A1* | 8/2021 | Shalev-Shwartz | ............ | |
| | | | | B60W 30/0956 |
| 2022/0135039 A1* | 5/2022 | Jardine | ......... | B60W 30/18159 |
| | | | | 701/26 |
| 2022/0351526 A1* | 11/2022 | Bar Zvi | ............ | B60W 10/04 |
| 2023/0076599 A1* | 3/2023 | Hung | ............ | G06F 9/3887 |
| 2023/0159050 A1* | 5/2023 | Hershkovich | ........ | G06V 20/58 |
| | | | | 701/26 |

* cited by examiner

SYSTEM AND METHOD FOR APPROACHING VEHICLE DETECTION

TECHNOLOGICAL FIELD

The present invention generally relates to an identification system for detecting an approaching vehicle and, more particularly, to an identification system that detects rear approaching vehicles via a camera system.

BACKGROUND

Operating environments for modern automobiles are increasingly complex. The combination of increased traffic with various technological or human distractions make maintaining an awareness of the surrounds of a vehicle challenging. In light of the increasing complexity of vehicle operating environments, the disclosure provides for an improved notification system that may assist in vehicle operation.

SUMMARY

According to one aspect of the present disclosure, an identification apparatus for an equipped vehicle includes a camera configured to capture image data in a field of view directed to an exterior region proximate to the equipped vehicle. A controller is in communication with the camera. The controller identifies an object in the image data and identifies a proportion of the object in response to pixels representing the object in the image data. The controller communicates a notification indicating a trailing vehicle in response to the object approaching the camera in excess of a threshold.

Embodiments of the disclosure may include any one or a combination of the following features or steps:

the controller further identifies the object as the trailing vehicle in response to the object following in an operating lane of the equipped vehicle;
  the identification of the trailing vehicle distinguishes the trailing vehicle following in an operating lane from an adjacent vehicle in an adjacent lane;
  the controller further detects a lane width of the operating lane of the equipped vehicle based on the image data;
  the controller further identifies the object as the trailing vehicle in response to the proportion of the object overlapping a predetermined width of the operating lane in the image data;
  the predetermined width is at least 60% of the lane width;
  the controller further calculates an approach rate of the trailing vehicle based on a rate of change of the proportion of the trailing vehicle represented in the image data;
  the proportion is a vehicle width calculated based on the trailing vehicle represented in the image data;
  the controller further generates a bounding box identifying a perimeter of the trailing vehicle in the image data;
  the proportion is a vehicle width of the bounding box of the trailing vehicle in the image data;
  the threshold is a rate threshold and the notification is communicated in response to the approach rate of the trailing vehicle exceeding the rate threshold;
  a notification device disposed in a passenger compartment of the equipped vehicle, wherein the notification device is configured to output at least one of an audible or visual notification in response to the notification indicating the trailing vehicle;
  the controller further identifies dimensions of the trailing vehicle in the image data;
  the controller further identifies a classification or model of the trailing vehicle based on a trained model that processes the image data;
  determines the dimensions in response to the classification of the trailing vehicle;
  vehicle types forming the classification are grouped based on the dimensions of the trailing vehicle as represented in the field of view; and
  a distance of the trailing vehicle is identified based on the proportion of the trailing vehicle in the image data and dimensions of the trailing vehicle.

In another aspect of the present disclosure, a method for identifying a trailing vehicle includes capturing image data in a field of view directed toward an exterior region proximate to an equipped vehicle. The image data is processed to identify an object and when the object is classified as a trailing vehicle in response to the object following in an operating lane of the equipped vehicle. A proportion of the trailing vehicle is identified in response to the pixels representing the object in the image data. An approach rate of the trailing vehicle is calculated based on the rate of change of the proportion represented in the image data. A notification is output in response to the approach rate of the trailing vehicle exceeding a rate threshold.

Embodiments of the disclosure may include any one or a combination of the following features or steps:

a classification of the trailing vehicle is identified based on a trained model, wherein the classification comprises at least one of a vehicle type and a mode;
  detecting lane width of the operating lane of the equipped vehicle based on the image data; and
  identifying the object as the trailing vehicle in response to the proportion of the object overlapping a predetermined lane width of the operating lane in the image data.

In yet another aspect of the present disclosure, an identification system for an equipped vehicle includes a camera configured to capture image data in a field of view directed to an exterior region of the equipped vehicle. A notification device is disposed in the passenger compartment of the equipped vehicle. The notification device is configured to output at least one of an audible indication or a visual indication in response to a notification indicating the trailing vehicle. A controller is in communication with the camera and the notification device. The controller identifies an object in the image data and generates a bounding box defined by a perimeter of the object. The controller further classifies the object as a trailing vehicle in response to the boundary box overlapping a predetermined width of a lane width of an operating lane of the equipped vehicle. The controller further identifies a proportion of the bounding box and calculates an approach rate of the trailing vehicle based on a rate of change of the proportion of the bounding box. In response to the approach rate of the trailing vehicle exceeding a rate threshold, the controller communicates the notification indicating the trailing vehicle via the notification device.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
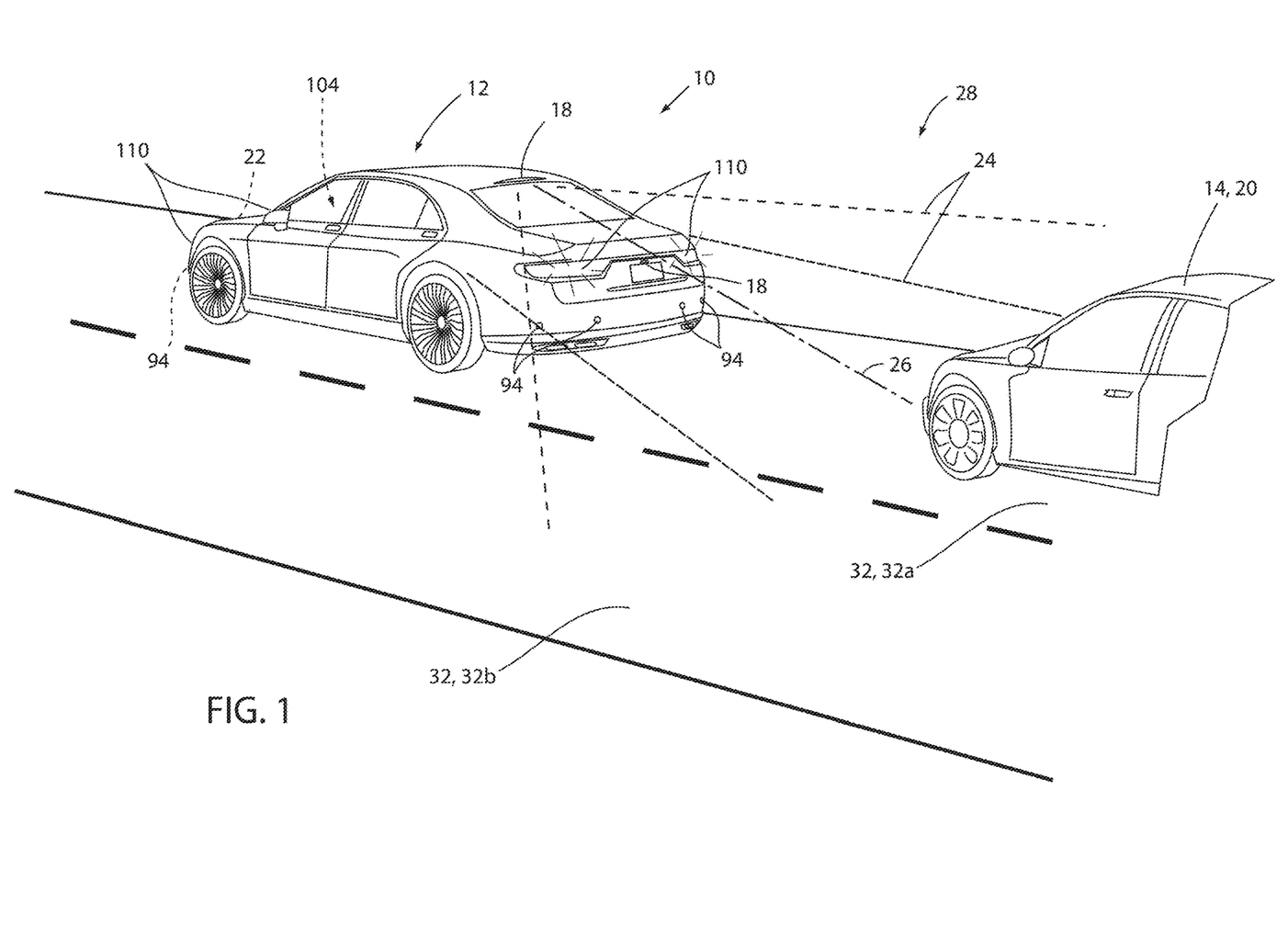
FIG. 1 is a projected environmental view of a vehicle demonstrating a notification system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Figure 2:
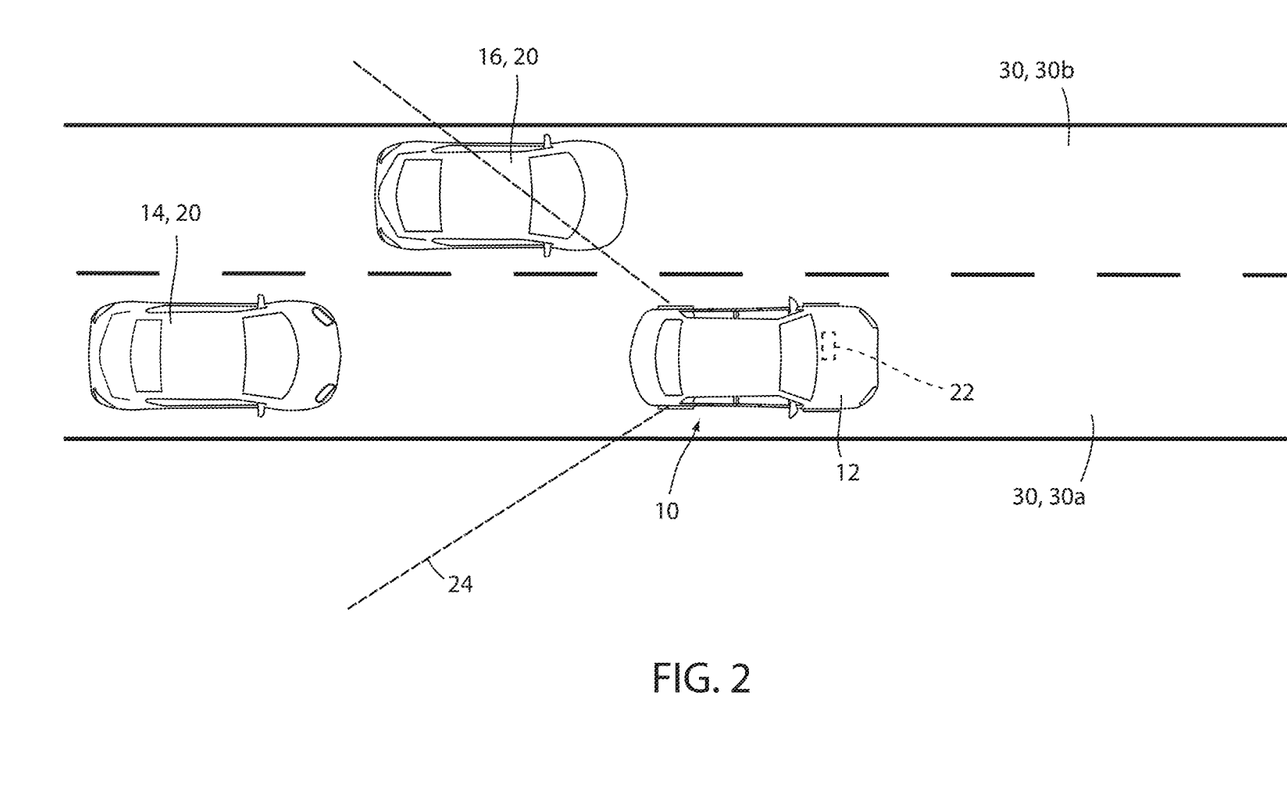
FIG. 2 is an aerial view of an operating environment of a vehicle equipped with a notification system or apparatus.

Referring generally to FIGS. 1 and 2, an identification system 10 is shown incorporated in an automotive vehicle, referred to herein as an equipped vehicle 12 for clarity. The equipped vehicle 12 may be distinguished from a trailing vehicle 14 or an adjacent vehicle 16, each of which may be detected and identified based on image data captured by a camera 18 of the identification system 10. In general, the identification system 10 may operate by processing and monitoring the image data captured by the camera 18 to identify one or more objects 20 and identify whether the objects 20 correspond to the trailing vehicle 14, the adjacent vehicle 16, and indicate whether the trailing vehicle 14 is approaching the equipped vehicle 12 at a rate that exceeds a rate threshold. As described in various implementations, the approach rate may correspond to a difference in relative velocity between the trailing vehicle 14 and the equipped vehicle 12, which may be identified by the system 10 to trigger a notification to an operator or passenger of the equipped vehicle 12 in response to the approach rate exceeding a rate threshold. Thus, system 10 may provide for a notification of the trailing vehicle 14 at an excessive rate, such that the operator of the equipped vehicle 12 may respond accordingly.

In operation, a controller 22 of the system 10 may process the image data captured in a field of view 24 of a camera 18. The field of view 24 may be directed along a focal axis 26 directed outward into the operating environment 28 of the equipped vehicle 12. For example, the focal axis 26 of the field of view 24 may be directed rearward from the equipped vehicle 12 toward an operating surface 30 of a roadway comprising a plurality of lanes 32. When processing the image data from the camera 18, the controller 22 may identify the lanes 32 and distinguish an operating lane 32a of the equipped vehicle 12 from an adjacent lane 32b based on one or more lane lines 34. By distinguishing the operating lane 32a from the adjacent lane 32b, the controller 22 may identify whether the objects 20 in the image data correspond to the trailing vehicle 14 in the operating lane 32a or the adjacent vehicle 16 operating in the adjacent lane 32b. Based on the identification of the trailing vehicle 14, the controller 22 may limit false detections of approaching vehicles that are operating in either one or more adjacent lanes 32b.

Once the controller 22 of the identification system 10 identifies the trailing vehicle 14, the controller 22 may monitor the image data corresponding to the trailing vehicle 14 to identify whether the trailing vehicle 14 is approaching the equipped vehicle 12. Based on the determination of the trailing vehicle 14 approaching the equipped vehicle 12, the controller 22 may further determine whether an approach rate of the trailing vehicle 14 exceeds a rate threshold and/or whether a distance or proximity of the trailing vehicle 14 is within a distance threshold. Based on a determination of the trailing vehicle 14 approaching the equipped vehicle 12 in excess of the rate threshold or within the distance threshold, the controller 22 of the identification system 10 may communicate or output a notification indicating that the trailing vehicle 14 is approaching or tailgating the equipped vehicle 12.

Figure 3A:
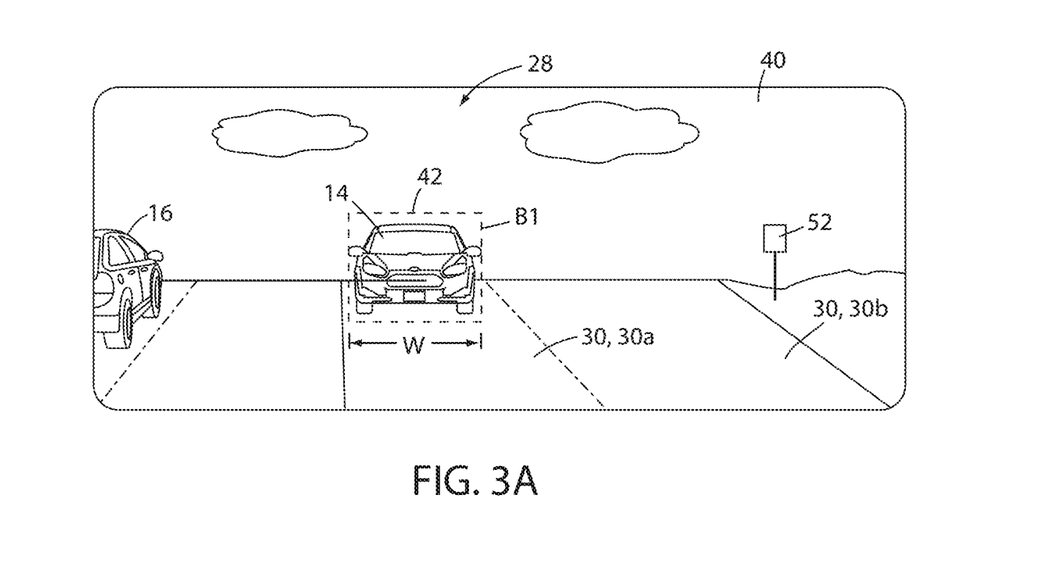
FIG. 3A is an exemplary depiction of image data captured by a camera of an identification apparatus.
Figure 3B:
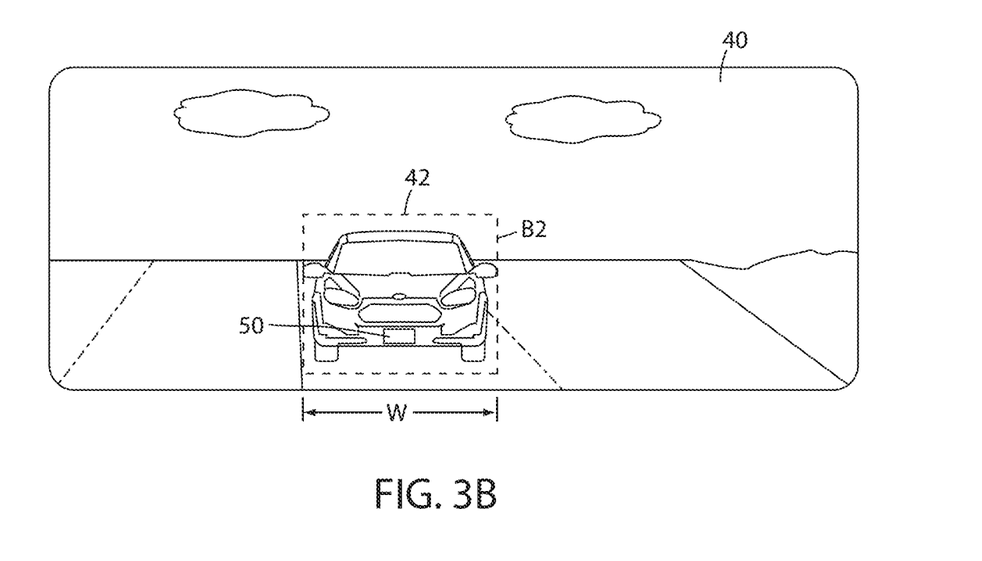
FIG. 3B is an exemplary depiction of image data captured by a camera of an identification apparatus.
Figure 4:
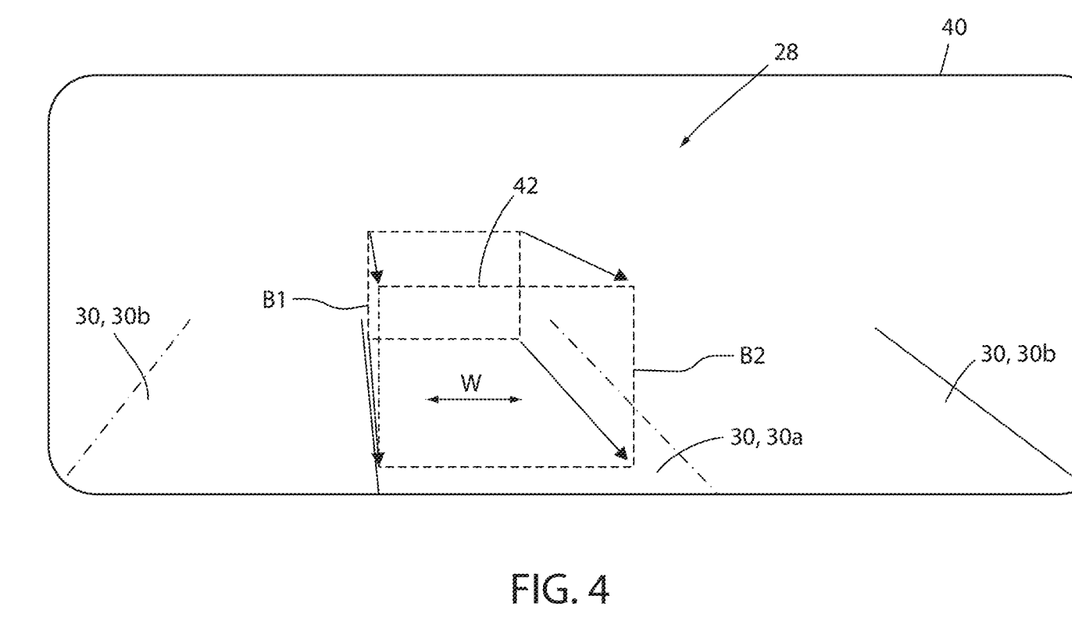
FIG. 4 is representation of a vehicle area of a trailing vehicle that changes as it approaches an equipped vehicle comprising the identification apparatus.

Referring now to FIGS. 3A, 3B, and 4, exemplary image data 40 captured by the camera 18 and corresponding processing techniques for the image data 40 are shown. As discussed in various aspects of the disclosure, the image data 40 may be processed by the controller 22 to identify various objects 20 and determine if the objects 20 correspond to the trailing vehicle 14, the adjacent vehicle 16, or various additional objects. As previously discussed, the trailing vehicle 14 may be distinguished from the adjacent vehicle 16 by determining the operating lane 32a of the equipped vehicle 12 and determining the trailing vehicle 14 as operating in the operating lane 32a. In this way, the identification system 10 may distinguish vehicles that are approaching within the same lane or the operating lane 32a from other vehicles operating in the adjacent lanes 32b.

In addition to determining the lateral operating position of the trailing vehicle 14 to be in the operating lane 32a, the controller 22 may identify a proximity of the trailing vehicle 14 in a variety of ways. In general, the proximity or distance between the trailing vehicle 14 and the equipped vehicle 12 may be identified based on the proportions of the trailing vehicle 14 as represented in the image data 40. However, the dimensions of the trailing vehicle 14 may vary drastically based on a classification, category, or model of the vehicle. For example, different categories of vehicles (e.g., sedans, trucks, busses, etc.) have different dimensions and, therefore, the proportions of areas or bounding box 42 of the image data 40 occupied by different categories or variations of the trailing vehicle 14 may differ. In order to account for these differences, the controller 22 may identify one or more reference features of the trailing vehicle 14 or other objects in the image data 40 to correlate the proportions of the trailing vehicle 14 to a real-world distance between the trailing vehicle 14 and the equipped vehicle 12.

As shown in FIG. 3A, the approaching vehicle 14 is enclosed in a first bounding box B1. Additionally, in FIG. 3B, the trailing vehicle 14 is demonstrated closer to the equipped vehicle 12 in a second bounding box B2. As the trailing vehicle 14 approaches the equipped vehicle 12, the proportions of the bounding box 42 between the first bounding box B1 and the second bounding box B2 increase. Though as a result of the varying dimensions of various trailing vehicles 14, the controller 22 may not be operable to definitively identify the distance of the trailing vehicle 14 strictly based on the proportions of the bounding box 42 and corresponding proportions of the trailing vehicle 14. As the proportions of the bounding box 42 change over time, the controller 22 may accurately identify a notification condition based on the proportions of the bounding box 42. More specifically, the rate of change of the proportions of the trailing vehicle 14 and the corresponding proportions of the bounding box 42 may be processed by the controller 22 to identify the relative speed and approach rate of the trailing vehicle 14 relative to the equipped vehicle 12 to determine if the rate threshold of the trailing vehicle 14 exceeds the approach rate defied by the system 10. In this way, an indication of the trailing vehicle 14 approaching the equipped vehicle 12 may be initiated.

As shown in FIGS. 3A and 3B, the trailing vehicle 14 is detected by the controller 22 in the image data 40 and a bounding box 42 is assigned to the trailing vehicle 14 defining the proportions or area of the image data 40 occupied by the trailing vehicle 14. As shown, the bounding box 42 may be monitored by the controller 22 in order to track the relative proportions of the trailing vehicle 14 in the image data 40 over time. Based on the proportions (e.g., width W) of the bounding box 42, the controller 22 may identify an approach rate of the trailing vehicle 14. For example, even in cases where the dimensions of the trailing vehicle 14 are unknown to the identification system 10, the controller 22 may compare the relative proportions or width of the bounding box 42 over time to approximate an approach rate of the trailing vehicle 14 relative to the equipped vehicle 12. If the approach rate of the trailing vehicle 14 exceeds a rate threshold, the controller 22 may communicate a notification of the trailing vehicle 14 to an operator or passenger of the equipped vehicle 12. Additionally, in cases where the reference feature of one or more of the objects 20 or the trailing vehicle 14 is identified by the controller 22, the controller 22 may process the image data 40 to accurately detect the distance of the trailing vehicle 14 relative to the equipped vehicle 12. Accordingly, the controller 22 may be operable to infer that the trailing vehicle 14 is approaching at an excessive rate based on the changing proportions of the bounding box 42 of the trailing vehicle 14 in the image data 40 and/or identify the distance of the trailing vehicle 14 based on the proportions of the trailing vehicle 14 based on the proportions of the bounding box 42 relative to the one or more reference features identified in the image data 40.

The reference features in the image data 40 may be identified based on a license plate 50, sign 52, class, category or model of the trailing vehicle 14, or various other objects that may have predetermined proportions. For example, the license plate 50 or sign 52 may have predefined proportions that may be accessed by the controller 22 to identify corresponding proportions of the objects 20, including the trailing vehicle 14, the adjacent vehicle 16, and various additional objects in the image data 40. In an exemplary embodiment, the controller 22 may apply a vehicle identification model configured to identify a category or model of the trailing vehicle 14 in the image data 40. For example, the controller 22 may implement machine learning to train a model to identify a category, make, and/or model of the trailing vehicle 14 based on the representation of the trailing vehicle 14 in the image data 40. That is, the controller 22 may utilize a variety of characteristics of the trailing vehicle 14 depicted in the image data to identify a specific model and/or make of a vehicle and/or identify a classification to which the vehicle belongs. Examples of vehicle categories may include a sedan, a truck, a bus, or various other vehicles, which may be grouped based on their proportions. The categorization of the vehicles based on their proportions may be particularly beneficial because vehicles with similar dimensions occupy the same proportions of the image data 40 and may be tracked by the controller 22 based on similar proportions (e.g., width W) of the bounding box 42. Once the model or classification of the trailing vehicle 14 is identified by the controller 22, the corresponding dimensions may be applied as a reference to identify the actual distance of the trailing vehicle 14 relative to the equipped vehicle 12 based on the proportions of the bounding box 42 within the image data 40.

In general, the vehicle identification model may correspond to a trained model derived from a neural network for image recognition. In operation, the neural network may be trained based on data sets captured from rear directed fields of view from vehicles demonstrating various trailing vehicles 14. The neural network may apply self-attention to enhance import aspects of the image data and filter or fade other components. The neural network may comprise a plurality of neurons, which may be arranged in a three-dimensional array comprising a width, a depth, and a height. The arrangement of the neurons in this configuration may provide for each layer (e.g. dimensional cross section of the array) to be connected to a small portion of the preceding layer. In this way, the network may process the data through regression to reduce each image to a features corresponding to models or categories of vehicles and match the features to a vehicle library. The neural network implemented by the disclosure may correspond to a pre-trained, convolutional neural network configured to detect vehicles from the image data 40 captured by the camera 18. Examples of pre-trained models that may be implemented for the training process a may include, but are not limited to, the following: SSD Mobilenet, AlexNet, ZF Net, GoogLeNet, VGGNet, ResNet, etc.

Referring now to FIG. 4, though discussed generally as objects or reference features detected in the image data 40, the dimensions of the trailing vehicle 14 as identified by the controller 22 may be utilized to identify a distance between the trailing vehicle 14 and the equipped vehicle 12. The reference features may correspond to dimensions of the license plate 50 or dimensions of the trailing vehicle 14 as identified or estimated by the vehicle identification model. In various cases, the controller 22 may determine the width W or other proportions of the bounding box 42 based on the number of pixels extending along the width W or other dimensions identified in the image data 40. Once the dimensions or width W of the object 20, in this case the trailing vehicle 14, are identified, the dimensions of the trailing vehicle 14 as identified by the trained model operating on the controller 22 may be used to correlate the proportions of each of the pixels to a real-world proportion represented in the image data 40. Based on this relationship, the actual distance between the trailing vehicle 14 and the equipped vehicle 12 may be estimated based on the pixel distance projected along the focal axis 26 of the camera 18. In this way, the controller 22 may identify an actual or estimated distance between the trailing vehicle 14 and the equipped vehicle 12 that may be utilized to activate the notification of the trailing vehicle 14.

Figure 5:
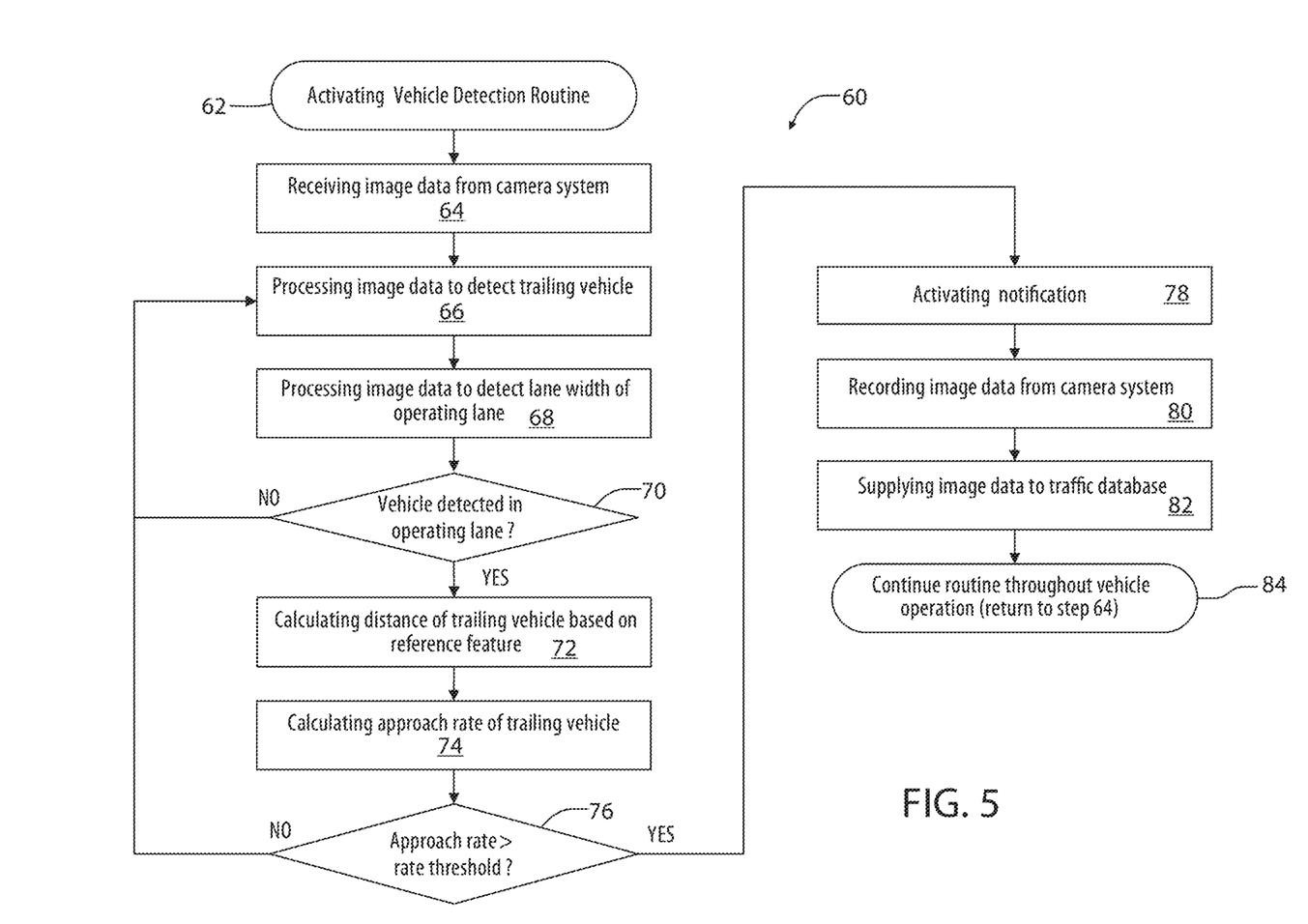
FIG. 5 is a flow chart demonstrating a method for detecting a trailing vehicle.

Referring now to FIG. 5, a flow chart of an exemplary method 60 for activating a notification of the trailing vehicle 14 is shown. Beginning with step 62, the vehicle detection routine may be activated in response to an operating condition of the equipped vehicle 12. For example, the detection routine may be activated in response to the vehicle operating in a forward direction as communicated via a communication bus 102 to the controller 22. Once activated, the method 60 may receive image data 40 from the camera 18 (64). The image data 40 may be processed by the controller 22 to detect the trailing vehicle 14 (66). As previously discussed, the image data 40 may be processed via a trained model derived from one or more Nero networks or convolutional Nero networks.

Once the trailing vehicle 14 is identified in the image data 40, the method 60 may continue by processing the image data to detect a lane width of the operating lane 32a of the equipped vehicle 12 (68). The lane width may be calculated based on a number of pixels corresponding to the width of the operating lane 32a represented in the image data 40. Based on the lane width and the location of the trailing vehicle 14 as represented by the bounding box 42 as previously discussed, the method 60 may further determine whether the trailing vehicle is located in the operating lane 32a (70). In operation, the controller 22 may determine whether the trailing vehicle 14 is traveling within the operating lane 32a in response to a predetermined proportion of the trailing vehicle 14 and the corresponding bounding box 42 overlapping the width of the operating lane 32a in the image data 40. For example, if the trailing vehicle 14 overlaps at least 60% of the operating lane 32a, the controller 22 may determine that the trailing vehicle 14 is traveling in the same lane as the equipped vehicle 12. Though the minimum overlapping lane width between the trailing vehicle 14 and the operating lane 32a is described as being at least 60%, the overlapping width threshold between the bounding box 42 of the trailing vehicle 14 and the width of the operating lane 32a may vary. For example, the overlapping width threshold may be at least 65%, 70%, 75%, 80%, 85%, or any percentage greater or between the exemplary percentages noted.

In response to the trailing vehicle 14 identified in the operating lane 32a, the method 60 may continue by calculating the distance of the trailing vehicle 14 based on the dimensions of one or more referenced features as previously discussed (72). Though the distance between the equipped vehicle 12 and the trailing vehicle 14 may assist the controller 22 in accurately detecting the presence of the trailing vehicle 14 and a corresponding notification condition, the distance may not be necessary to process the method 60. That is, calculating or estimating the distance of the trailing vehicle 14 may require additional steps including information in the form of reference features identified in the image data 40. Such information may not always be available to the controller 22 and may, in some cases, be challenging to process based on complexities of the identification of a model of the trailing vehicle 14 or other reference features as previously discussed. Accordingly, the calculation of the actual distance specified in step 72 may not be necessary to process the method 60.

Following the detection of the trailing vehicle 14 in the operating lane 32a, the controller 22 may calculate the distance in step 72 of the trailing vehicle 14 and/or calculate an approach rate of the trailing vehicle 14 in step 74. The approach rate of the trailing vehicle 14 may be calculated based on the changing proportions of the bounding box 42 and may not require a correlation between the real-world dimensions of the trailing vehicle 14 to the corresponding pixel dimensions in the image data 40. Once the approach rate of the trailing vehicle 14 relative to the equipped vehicle 12 is identified, the method may continue to determine whether the approach rate is greater than a rate threshold (76). Additionally, the controller 22 may compare the distance of the trailing vehicle 14 (if calculated in step 72) to a distance threshold in step 76. Based on the comparison of the approach rate and/or the distance of the trailing vehicle 14 to the rate threshold and/or distance threshold, the controller 22 may activate a notification communicated (step 78) to an operator or passenger of the equipped vehicle 12. If the approach rate or distance of the trailing vehicle 14 does not exceed the corresponding threshold in step 76, the method may return to step 66 to continue processing the image data to detect the trailing vehicle 14.

In addition to the notification of the trailing vehicle 14 output in step 78, the controller 22 may further activates a recording procedure with the camera 18 to record the image data 40 depicting the trailing vehicle 14 (80). The image data 40 of the trailing vehicle 14 may further be supplied to a traffic data base, which may be used to identify offending vehicles by various law enforcement agencies (82). The recorded image data captured by the camera 18 may further be utilized to assist in further training the Nero networks that may be implemented to accurately detect the trailing vehicle 14 in the image data 40. In particular, in instances where the identification system 10 identifies errors or errors are reported in the detection of the trailing vehicle 14, the recorded image data from step 80 may be supplied to assist in further training and tuning of the trained models used to detect the trailing vehicle 14. Following step 82, the method 60 may continue throughout the operation of the vehicle by returning to step 64 (84).

In addition to the notification supplied to the operator or passenger in the passenger compartment of the equipped vehicle 12, the system 10 may additionally output one or more notifications to alert the trailing vehicle 14 of an approach rate or proximity of the trailing vehicle 14 to the equipped vehicle 12. For example, the notification system may be in communication with one or more lighting or notification devices (e.g., vehicle tail lights, indicator lights, etc.).

Figure 6:
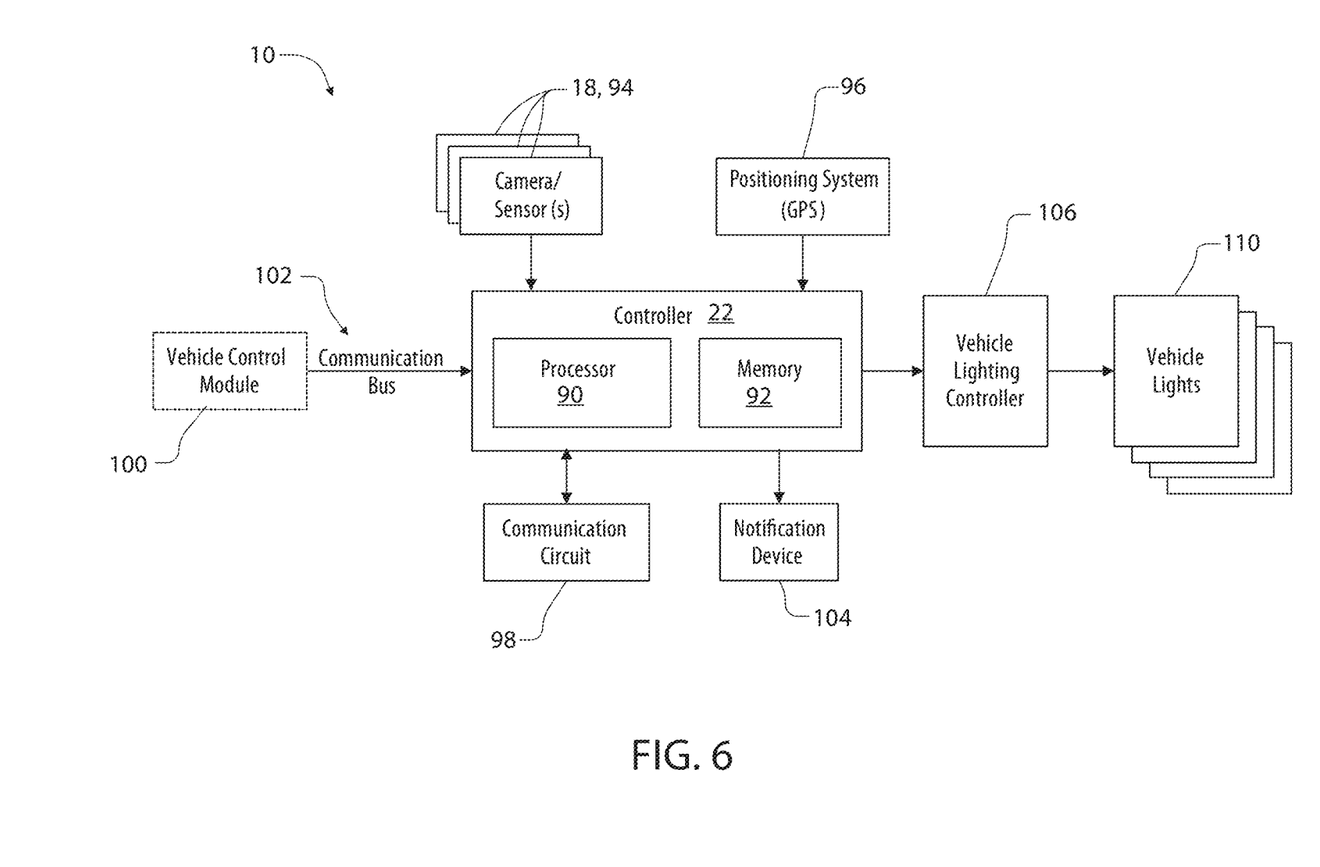
FIG. 6 is a block diagram of an identification system for a vehicle in accordance with the disclosure.

Referring now to FIG. 6, a block diagram of the detection system 10 is shown. As previously discussed, the system 10 may comprise the controller 22. The controller 22 may be implemented alone or in combination with one or more computerized processing units of the vehicle that may provide for various navigational or advanced driver assistance systems (ADAS). Accordingly, the controller 22 may comprise a processor 90, which may correspond to one or more circuits configured to receive signals and information from a variety of vehicle systems, peripherals, and systems discussed herein. The processor 90 may correspond to one or more microprocessors, circuits, application specific integrated circuits (ASIC), microprocessors, and/or related processing devices. The processor 90 may be in communication with a memory 92. The memory 92 may correspond to random access memory (RAM), read only memory (ROM), magnetic disc storage media, optical storage media, flash memory devices, etc. In various embodiments, the memory 92 may be configured to store machine readable information or routines to enable various processes and methods disclosed herein.

In addition to the camera 18, the system 10 may comprise one or more sensors 94 which may be in communication with a controller 22. The sensors 94 may correspond to infrared sensors, short range radar sensors, ultra-sonic sensors, and/or a long range radar sensor. Each of the corresponding sensory technologies may comprise an operating range or a detection range over which the sensor may be operable to detect the trailing vehicle 14. Accordingly, the data from each of the sensors 94 may be communicated to the controller 22 and used in combination with the image data 40 as discussed herein.

The controller 22 may further be in communication with the positioning system 96 (e.g. global positioning system [GPS]). In an exemplary embodiment, the controller 22 may access the map data via the memory 92, the positioning system 96, and/or via wireless communication through a communication circuit 98. In various cases, the position data from the positioning system may be linked to the image data 40 that may be recorded to report a trailing vehicle or tailgating notification event. Accordingly, the image data 40 recorded by the controller 22 may be communicated to remote database (e.g., a traffic or law enforcement database) with the position data indicating the location where the event occurred. Such information may be communicated to the remote database via the communication circuit 98. The communication circuit 98 may correspond to a communication interface operating based on one or more known or future developed wireless communication technologies. For example, the communication circuit 98 may operate based on one or more protocols including, but not limited to, WiMAX, Wi-Fi, and/or cellular protocols (e.g. GSM, CDMA, LTE, 4G, 5G, etc.).

The controller 22 may further be in communication with a vehicle control module 100 via a communication bus 102. In this way, the controller 22 may be configured to receive various signals or indications of vehicle status conditions including but not limited to a gear selection (e.g. park, drive, etc.), a vehicle speed, an engine status, a fuel notification, and various other vehicle conditions. These conditions may be reported with the image data 40 and the position data for reference in the remote database.

In order to communicate the notification of the trailing vehicle 14, the controller may further be in communication one or more notification devices 104. The notifications devices 104 may correspond to various interior or exterior devices that may be activated to display or communicate notifications or indications of the trailing vehicle 14. In some examples, the notification device 104 may correspond to a display or speaker disposed in a passenger compartment of the equipped vehicle 12. For example, the display may be incorporated in or implements as a media display (e.g., center stack), indicator light, gage cluster, etc. The notification device may similarly correspond to a horn, loudspeaker, or exterior notification device that communicates audible alerts in the operating environment 28. Exterior notifications may similarly be output via exterior displays or lighting devices. For example, in various embodiments, the controller 22 may be in communication with a lighting controller 106. The lighting controller 106 may be configured to control one or more vehicle lights (e.g. the exterior vehicle lights 110, see FIG. 1). Accordingly, the system 10 may detect the trailing vehicle 14 and output a notification from the equipped vehicle 12 in a variety of ways.

As discussed herein, the controllers or processors of the disclosed system may correspond to devices that perform computer-implemented processes and apparatuses for practicing those processes. Implementations also may be embodied in the form of a computer program product having computer program code containing instructions embodied in non-transitory and/or tangible media, such as hard drives, USB (universal serial bus) drives, or any other machine readable storage medium, where computer program code is loaded into and executed by a computer, which provides for the configuration of a special-purpose control device, controller, or computer that implements the disclosed subject matter. Implementations also may be embodied in the form of computer program code, for example, whether stored in a storage medium, loaded into and/or executed by a computer/controller, or transmitted over some transmission medium or communication interfaces, wherein when the computer program code is loaded into and executed by controller, the controller becomes an apparatus for practicing implementations of the disclosed subject matter. When implemented on a general-purpose microprocessor, the computer program code segments configure the microprocessor to create specific logic circuits. Implementations of the controller may be implemented using hardware that may include a processor, for example, circuits such as an ASIC (Application Specific Integrated Circuit), portions or circuits of individual processor cores, entire processor cores, individual processors, programmable hardware devices such as a field programmable gate arrays (FPGA), and/or larger portions of systems that include multiple processors or multiple controllers that may operate in coordination.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An identification apparatus for an equipped vehicle comprising:
    a camera configured to capture image data in a field of view directed to an exterior region proximate to the equipped vehicle;
    a controller in communication with the camera, wherein the controller:
    identifies an object in the image data;
    identifies a proportion of the object in response to a number of pixels representing the object in the image data;
    detects a lane width of an operating lane of the equipped vehicle based on the image data;
    identifies the object as a trailing vehicle in response to the proportion of the object overlapping a predetermined width of at least 60% of a lane width of the operating lane of the equipped vehicle in the image data, wherein the identification of the trailing vehicle distinguishes the trailing vehicle following in the operating lane from an adjacent vehicle in an adjacent lane; and
    communicates a notification indicating the trailing vehicle in response to the object approaching the equipped vehicle in excess of an approach-rate threshold.

2. The identification apparatus according to claim 1, wherein the controller further:
    calculates an approach rate of the trailing vehicle based on a rate of change of the proportion of the trailing vehicle represented in the image data.

3. The identification apparatus according to claim 2, wherein the proportion is a vehicle width calculated based on the trailing vehicle represented in the image data.

4. The identification apparatus according to claim 2, wherein the controller further:
    generates a bounding box identifying a perimeter of the trailing vehicle in the image data.

5. The identification apparatus according to claim 4, wherein the proportion is a vehicle width of the bounding box of the trailing vehicle in the image data.

6. The identification apparatus according to claim 2, wherein the threshold is a rate threshold and the notification is communicated in response to the approach rate of the trailing vehicle exceeding the rate threshold.

7. The identification apparatus according to claim 1, further comprising:
    a notification device disposed in a passenger compartment of the equipped vehicle, wherein the notification device is configured to output at least one of an audible or visual notification in response to the notification indicating the trailing vehicle.

8. The identification apparatus according to claim 1, wherein the controller further:
    identifies dimensions of the trailing vehicle in the image data.

9. The identification apparatus according to claim 8, wherein the controller further:
    identifies a classification or model of the trailing vehicle based on a trained model that processes the image data; and
    determines the dimensions in response to the classification of the trailing vehicle.

10. The identification apparatus according to claim 9, wherein vehicle types forming the classification are grouped based on the dimensions of the trailing vehicle as represented in the field of view.

11. The identification apparatus according to claim 9, wherein a distance of the trailing vehicle is identified based on the proportion of the trailing vehicle in the image data and dimensions of the trailing vehicle.

12. A method for identifying a trailing vehicle comprising:
    capturing image data in a field of view directed to an exterior region proximate to an equipped vehicle;
    processing the image data to identify an object;
    identifying the object as the trailing vehicle in response to the object following in an operating lane of the equipped vehicle;
    identifying a proportion of the trailing vehicle in response to a number of pixels representing the trailing vehicle in the image data, wherein the proportion of the trailing vehicle overlaps a majority of the operating lane;
    calculating an approach rate of the trailing vehicle based on a rate of change of the proportion of bounding box represented in the image data; and
    outputting a notification in response to the approach rate of the trailing vehicle exceeding a rate threshold.

13. The method according to claim 12, wherein a classification of the trailing vehicle is identified based on a trained model, wherein the classification comprises at least one of a vehicle type and a model.

14. An identification system for an equipped vehicle comprising:
    a camera configured to capture image data in a field of view directed to an exterior region of the equipped vehicle;
    a notification device disposed in a passenger compartment of the equipped vehicle, wherein the notification device is configured to output at least one of an audible indication or a visual indication in response to a notification indicating a trailing vehicle; and
    a controller in communication with the camera and the notification device, wherein the controller:
    identifies an object in the image data;
    generates a bounding box defined by a perimeter of the object;
    classifies the object as the trailing vehicle in response to the bounding box overlapping at least 60% of a predetermined width of a lane width of an operating lane of the equipped vehicle;
    identifies a proportion of the bounding box;
    calculates an approach rate of the trailing vehicle based on a rate of change of the proportion of the bounding box; and communicates the notification via the notification device indicating a trailing vehicle in response to the approach rate of the trailing vehicle exceeding a rate threshold.

15. The identification system according to claim 14, wherein the controller detects the lane width of the operating lane of the equipped vehicle based on the image data.

16. The identification system according to claim 14, wherein the proportion of the bounding box is a vehicle width calculated based on the trailing vehicle represented in the image data.

17. The identification system according to claim 14, wherein the trailing vehicle is identified as being located in the operating lane of the equipped vehicle and the trailing vehicle is distinguished from an adjacent vehicle outside the operating lane of the equipped vehicle.

\* \* \* \* \*